United States Patent
Iriyama

(10) Patent No.: US 9,028,078 B2
(45) Date of Patent: May 12, 2015

(54) LENS APPARATUS AND IMAGE PICKUP APPARATUS INCLUDING THE SAME

(71) Applicant: Canon Kabushiki Kaisha, Tokyo (JP)

(72) Inventor: Yutaka Iriyama, Saitama (JP)

(73) Assignee: Canon Kabushiki Kaisha (JP)

( * ) Notice: Subject to any disclaimer, the term of this patent is extended or adjusted under 35 U.S.C. 154(b) by 110 days.

(21) Appl. No.: 13/967,627

(22) Filed: Aug. 15, 2013

(65) Prior Publication Data

US 2014/0049828 A1 Feb. 20, 2014

(30) Foreign Application Priority Data

Aug. 16, 2012 (JP) ................................ 2012-180515

(51) Int. Cl.
  *G02B 27/00* (2006.01)
  *G02B 1/11* (2006.01)

(52) U.S. Cl.
  CPC ........ *G02B 1/11* (2013.01); *G02B 27/00* (2013.01); *G02B 1/118* (2013.01)

(58) Field of Classification Search
  CPC ...... G02B 13/0045; G02B 1/11; G02B 1/118; G02B 13/04; G02B 1/10; G02B 1/115; G02B 1/02; G02B 1/041; G02B 1/111
  USPC ......... 359/700, 715, 716, 713, 753, 754, 682, 359/734, 747, 771, 708, 601; 351/44
  See application file for complete search history.

(56) References Cited

FOREIGN PATENT DOCUMENTS

| JP | 2005-316386 A | 11/2005 |
|---|---|---|
| JP | 2009-139775 | * 6/2009 |
| JP | 2009-139775 A | 6/2009 |

* cited by examiner

*Primary Examiner* — Thomas K Pham
*Assistant Examiner* — Sharrief Broome
(74) *Attorney, Agent, or Firm* — Rossi, Kimms & McDowell LLP

(57) ABSTRACT

Lens apparatus includes adjacent concave and convex lens surfaces adjacent with an air layer therebetween. At least one of the lens surfaces includes an antireflection film including multiple subwavelength structures at an average pitch of 400 nm or smaller. The surface satisfies:

$0.7 < R_1/R_2 < 1.3$, and $|\theta_2 - \theta_1| > 15°$, provided that:

$D = f/FNo$, $\theta_1 = \sin^{-1}(D/(2 \times f_i))$, and $\theta_2 = \sin^{-1}((h \times D)/R_2)$, where f and FNo represent focal length and F-number of the entire optical system, $f_1$ represents focal length of an optical system on object side with respect to the air layer between the lens surfaces, h represents axial conversion beam height on the at least one surface having anti-reflection film, $R_1$ and $R_2$ represent curvature radii of surfaces of respective object and image sides between the lens surfaces.

7 Claims, 9 Drawing Sheets

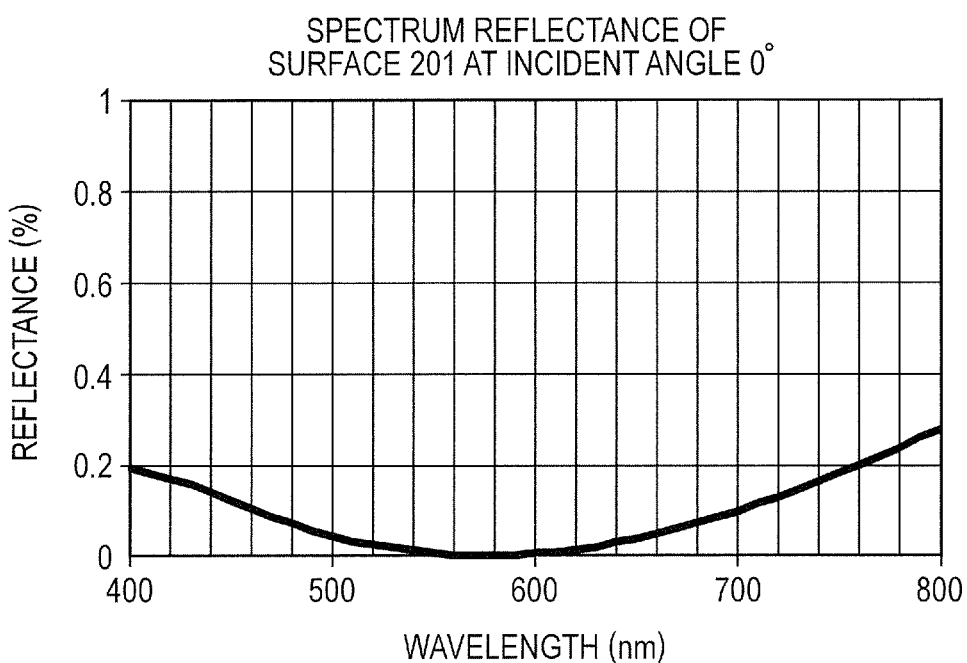
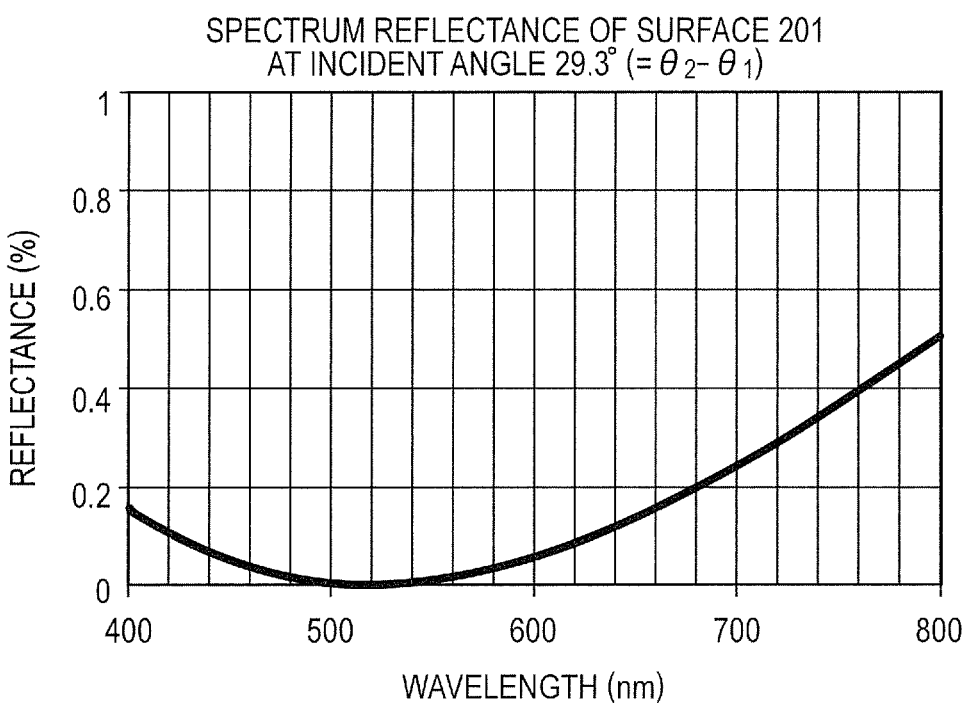

SPECTRUM REFLECTANCE OF SURFACE 401 AT INCIDENT ANGLE 0°

SPECTRUM REFLECTANCE OF SURFACE 401 AT INCIDENT ANGLE 38.4° (= $\theta_2 - \theta_1$)

SPECTRUM REFLECTANCE OF
SURFACE 601 AT INCIDENT ANGLE 0°

SPECTRUM REFLECTANCE OF SURFACE 601
AT INCIDENT ANGLE 40.6° ($=\theta_2-\theta_1$)

LENS APPARATUS AND IMAGE PICKUP APPARATUS INCLUDING THE SAME

BACKGROUND OF THE INVENTION

1. Field of the Invention

The present invention relates to a lens apparatus and an image pickup apparatus including the lens apparatus, and more particularly, to a lens apparatus including an anti-reflection film having a subwavelength structure for anti-reflection property that is formed on an optical surface of an optical member in the lens apparatus, and to an image pickup apparatus including the lens apparatus.

2. Description of the Related Art

Conventionally, there is a concern about deterioration of image quality due to unnecessary reflection light on an optical element surface, which is called ghost or flare. Therefore, there is proposed an invention of an optical system using an anti-reflection film that can realize a low reflectance in a wide incident angle range.

For instance, Japanese Patent Application Laid-Open No. 2005-316386 discloses a technology of forming an anti-reflection film including at least one layer formed by using a sol-gel method on a light transparent member having a concave surface facing an aperture stop. Japanese Patent Application Laid-Open No. 2009-139775 discloses a technology of forming an anti-reflection structure formed of multiple micro convex/concave structures at an average pitch of 400 nm or smaller in at least one part in an optical system in which a concave lens surface and a convex lens surface are opposed to each other with an air layer therebetween.

In order to obtain a good anti-reflection effect in a wide wavelength range and in a wide incident angle range, it is important to appropriately set where to apply the anti-reflection film on the lens surface constituting the optical system. However, under the conditions of Japanese Patent Application Laid-Open No. 2005-316386 or Japanese Patent Application Laid-Open No. 2009-139775, the application part is set insufficiently so that a sufficient anti-reflection effect cannot be obtained.

SUMMARY OF THE INVENTION

Therefore, the present invention provides an image pickup apparatus that suppresses unnecessary reflection light having a large beam incident angle.

In order to achieve the above-mentioned object, according to one embodiment of the present invention, there is provided a lens apparatus, including an optical system including a concave lens surface and a convex lens surface adjacent to each other with an air layer therebetween. At least one of the concave lens surface and the convex lens surface includes an anti-reflection film including multiple subwavelength structures at an average pitch of 400 nm or smaller. The at least one of the concave lens surface and the convex lens surface satisfies the following expressions:

$$0.7 < R_1/R_2 < 1.3, \text{ and}$$

$$|\theta_2 - \theta_1| > 15°,$$

provided that:

$$D = f/F\text{No},$$

$$\theta_1 = \sin^{-1}(D/(2 \times f_1)), \text{ and}$$

$$\theta_2 = \sin^{-1}((h \times D)/R_2),$$

where f represents a focal length of the entire optical system, $f_1$ represents a focal length of an optical system on an object side with respect to the air layer between the concave lens surface and the convex lens surface, FNo represents an F-number of the entire optical system, h represents an axial conversion beam height on the at least one of the concave lens surface and the convex lens surface having the anti-reflection film formed thereon, $R_1$ represents a curvature radius of a surface situated on the object side between the concave lens surface and the convex lens surface, and $R_2$ represents a curvature radius of a surface situated on an image side between the concave lens surface and the convex lens surface.

According to one embodiment of the present invention, it is possible to provide an image pickup apparatus that suppresses unnecessary reflection light having a large beam incident angle so as to reduce occurrence of ghost or flare.

Further features of the present invention will become apparent from the following description of exemplary embodiments with reference to the attached drawings.

BRIEF DESCRIPTION OF THE DRAWINGS

FIG. 3A shows a spectrum reflectance of a surface at an incident angle of 0° according to Embodiment 1.

FIG. 3B shows a spectrum reflectance of the surface at an incident angle of 29.3° according to Embodiment 1.

DESCRIPTION OF THE EMBODIMENTS

Preferred embodiments of the present invention will now be described in detail in accordance with the accompanying drawings.

Figure 12A:
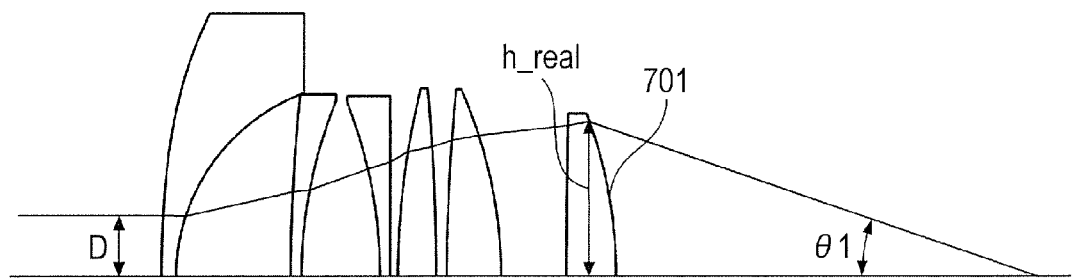
FIGS. 12A and 12B are schematic diagrams of a ghost beam according to the present invention.
Figure 12B:
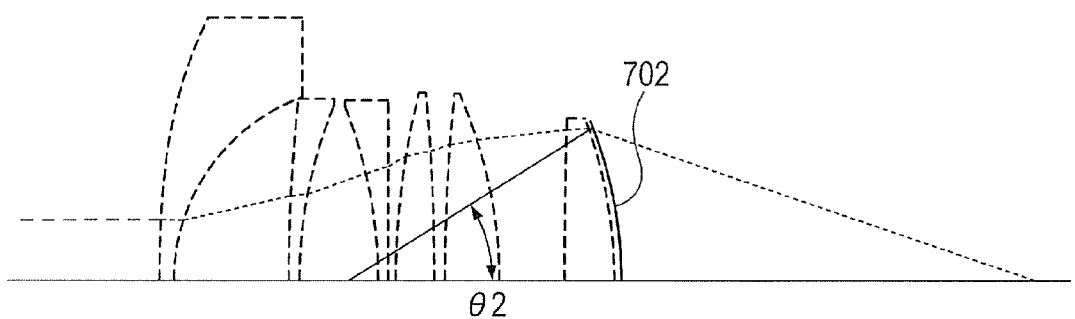

FIGS. 12A and 12B are schematic diagrams of a lens apparatus according to an embodiment of the present invention, and are cross-sectional views of the lens apparatus corresponding to Numerical Embodiment 1. A ghost occurs due to reflection by a surface 702 illustrated in FIG. 12B and a surface 701 illustrated in FIG. 12A, which are two surfaces adjacent to each other with an air layer therebetween. The two surfaces adjacent to each other with an extremely small air layer therebetween that cause ghost (surface 701 and surface 702 in FIGS. 12A and 12B) are hereinafter referred to as ghost reflecting surfaces in this specification.

FIG. 12A illustrates a part of a lens cross-sectional view and a manner in which a beam having a highest beam height among axial ghost beams passes through the surface 701. An angle $\theta_1$ indicates an angle between an optical axis and the ghost beam having a highest beam height after passing through the surface 701. This angle $\theta_1$ is calculated by Expression (1) based on a beam radius D of the incident beam and a focal length $f_1$ from a first surface to the surface 701.

$$\theta_1 = \sin^{-1}(D/(2 \times f_1)) \quad (1)$$

In addition, the beam radius D of the incident beam is calculated by Expression (2) based on a focal length f of the entire lens system (entire optical system) and an F-number FNo of the entire lens system (entire optical system).

$$D = f/FNo \quad (2)$$

This beam radius D has the same value as an incident pupil radius of normal light forming an image on an imaging plane. In the present invention, the surfaces 701 and 702 as surfaces generating ghost light, for which the problem is to be solved, have very similar curvatures and are disposed adjacent to each other, and hence an optical path of the ghost light is substantially the same as that of the normal light. A relationship between the curvatures of the surfaces 701 and 702 is described later. Therefore, in the present invention, the same expression for the incident pupil radius of the normal light is used.

FIG. 12B is a lens cross-sectional view in which the surface 702 is added to FIG. 12A. An angle $\theta_2$ indicates an angle between the optical axis and the normal to the surface 702 at a height at which a beam passes through the outermost periphery among the axial beams. This angle $\theta_2$ is calculated by Expression (3) from an axial conversion beam height h on a surface having an anti-reflection film formed thereon, the beam radius D of the incident beam, and a curvature radius $R_2$ of the surface 702 situated closer to the image side among the ghost reflecting surfaces. The axial conversion beam height h as used herein is a paraxial ray tracing value that is normalized by the focal length of the entire lens system so that a lens first surface incident beam height becomes 1. The paraxial ray tracing means ray tracing when sin i is approximated to be i (radian).

$$\theta_2 = \sin^{-1}((h \times D)/R_2) \quad (3)$$

Among the axial ghost beams entering the surface 702, the beam having a largest incident angle is a beam passing through the outermost periphery. Therefore, an incident angle of the beam passing through the outermost periphery with respect to the surface 702 is $|\theta_2 - \theta_1|$. In the present invention, the incident angle is set so as to satisfy Expression (4).

$$|\theta_2 - \theta_1| > 15° \quad (4)$$

When Expression (4) is satisfied, a difference between the incident angle of the beam passing through the outermost periphery of the lens and the incident angle of the axial ghost beam passing through the lens center is increased. Therefore, an effect of the anti-reflection film having multiple subwavelength structures at an average pitch of 400 nm or smaller and a wide reflectance suppression wavelength band is sufficiently exerted so that ghost light is suppressed. In addition, by considering Expression (4), it is possible to determine a position of introducing the anti-reflection film based on the focal length $f_1$ on the object side with respect to the surface to which the anti-reflection film is introduced and the curvature radius $R_2$ of the surface situated closer to the image side among the ghost reflecting surfaces.

Further, the curvature radius of the surface 701 and the curvature radius of the surface 702 are restricted by Expression (5). Here, $R_1$ represents a curvature radius of the surface 701 situated closer to the object side among the ghost reflecting surfaces.

$$0.7 < R_1/R_2 < 1.3 \quad (5)$$

When Expression (5) is satisfied, the incident angles of the ghost beam entering the surfaces 701 and 702 have similar values. Therefore, if the incident angle of the ghost beam is large, the beam is reflected with the large incident angle by both the surfaces 701 and 702. In the present invention, with respect to the ghost beam with the large incident angle to each of the two surfaces forming the ghost light, the anti-reflection film having the multiple subwavelength structures at an average pitch of 400 nm or smaller and a wide reflectance suppression wavelength band is formed on at least one surface. Thus, it is possible to obtain a larger effect of the anti-reflection film than in the conventional technology.

The anti-reflection film has a reflectance of 0.5% or lower for a wavelength of 400 to 750 nm at an incident angle of 0°. Further, the anti-reflection film has a characteristic satisfying the following expression:

$$0.1 < R_A/R_B < 1.5 \quad (6),$$

where $R_A$ represents a reflectance for light having a wavelength of 400 nm at an incident angle of $\theta_2 - \theta_1$, and $R_B$ represents a reflectance for light having a wavelength of 700 nm.

Embodiment 1

Now, with reference to FIGS. 1, 2A, 2B, 3A, 3B, 4A, and 4B, an image pickup apparatus according to Embodiment 1 of the present invention is described.

Figure 1:
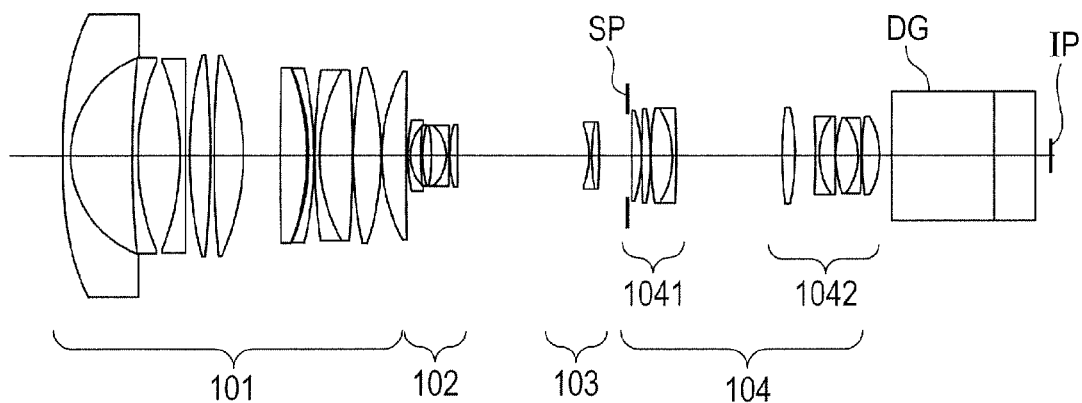
FIG. 1 is a lens cross-sectional view according to Embodiment 1 of the present invention.

FIG. 1 is a structural diagram of a zoom lens according to Embodiment 1 (Numerical Embodiment 1) of the present invention, and is an optical path diagram when being focused on an object at infinity at a wide angle end. Values of a focal length and an object distance are values when the numerical embodiments described later are expressed in units of mm. The object distance is a distance from a lens surface closest to the object. The same applies to each of the embodiments described below. In the lens optical path diagram, a first lens unit 101 does not move for zooming and has positive refractive power. The first lens unit 101 has refractive power for focusing, and a whole or a part of the lens unit having refractive power is moved so as to perform focusing. A second lens unit 102 is a lens unit having negative refractive power (variator lens unit), which moves during zooming. A third lens unit 103 is a lens unit having negative refractive power (compensator lens unit), which moves during zooming. This third lens unit 103 moves on the optical axis in synchronization with movement of the second lens unit so as to correct image plane variation due to zooming. An aperture stop SP is disposed between the third lens unit 103 and a fourth lens unit 104. The fourth lens unit 104 is a lens unit having positive refractive power for imaging (relay lens unit), which does not move for zooming. The fourth lens unit 104 includes a lens unit 1041 having positive refractive power and a lens unit 1042 having positive refractive power with a longest air gap therebetween. A color separation prism or optical filter DG is illustrated as a glass block. An image plane IP corresponds to an imaging plane of a solid-state image pickup element (photoelectric transducer).

Figure 2A:
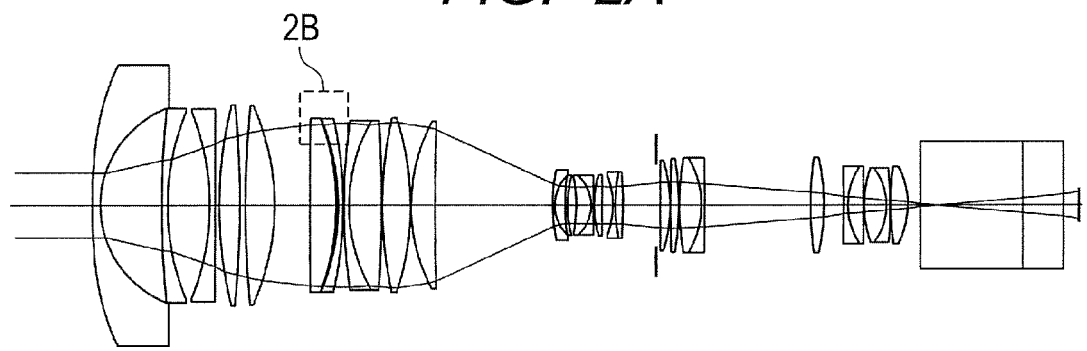
FIG. 2A illustrates an embodiment of a ghost optical path diagram according to Embodiment 1.
Figure 2B:
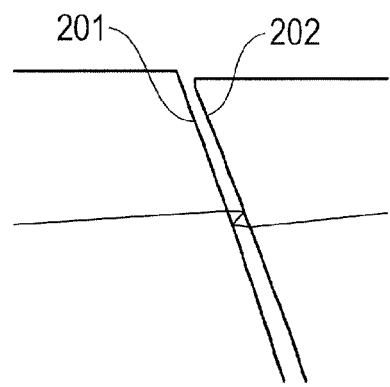
FIG. 2B is a partial enlarged view of the ghost optical path diagram of FIG. 2A.

FIG. 2A illustrates an example of a ghost optical path of the zoom lens at a focal length of 26.7 mm according to Embodiment 1 (Numerical Embodiment 1) of the present invention. FIG. 2B is a partial enlarged view of the ghost optical path illustrated in FIG. 2A. FIGS. 2A and 2B illustrate the optical path of the ghost beam in the case where a focus position is set to an object distance of 2 m (from the lens surface closest to the object) and a light source is set at 3 m (from the lens surface closest to the object). Here, the ghost light from the light source is reflected in order by a surface 202 and a surface 201 adjacent to each other with the air layer therebetween, and reaches the image plane IP. The anti-reflection film having multiple subwavelength structures at an average pitch of 400 nm or smaller and a wide reflectance suppression wavelength band is formed on the surface 201 and on the surface 202. This subwavelength structure includes multiple micro convex/concave structures having a density decreasing continuously from a glass side to an air side. With this structure, a substantial refractive index gradually approaches 1 from the glass side to the air side. Thus, the anti-reflection film having a wide reflectance suppression wavelength band is realized.

In addition, between the subwavelength structure of the anti-reflection film and the lens surface on which the subwavelength structure is formed, an intermediate film is formed, which is a single layer film or a multilayer film made of a material different from a material of the subwavelength structure. It is preferred that the intermediate film be made of an organic resin. This intermediate film has a function of adjusting a refractive index difference between a refractive index of the subwavelength structure and a refractive index of the lens glass. Thus, higher anti-reflection performance can be realized. It is preferred to satisfy the condition of Expression (7):

$$nb \geq ni \geq ns \quad (7),$$

where nb represents a refractive index of the glass constituting the lens, ni represents a refractive index of the material of the intermediate film, and ns represents a refractive index of the material of the subwavelength structure.

By disposing the anti-reflection film satisfying this condition, a higher anti-reflection effect can be realized. In this embodiment, the surface 201 has d-line (587.56 nm) refractive indexes nb=1.497, ni=1.46, and ns=1.4-1.0, and the surface 202 has d-line (587.56 nm) refractive indexes nb=1.883, ni=1.63, and ns=1.4-1.0. The expression "1.4-1.0" means that the refractive index is continuously decreased from 1.4 to 1.0 from the intermediate film side to a front surface side.

In this embodiment, the curvature radius $R_1$ of the surface 201 (convex lens surface) is −79.6 mm, and the curvature radius $R_2$ of the surface 202 (concave lens surface) is −73.7 mm. Each of the surfaces is formed to be convex toward the aperture stop. $R_1/R_2$ is 1.08. Therefore, the condition of Expression (5) is satisfied. When this condition of Expression (5) is satisfied, the incident angles of the ghost beam to the two surfaces reflecting the ghost light have similar values.

In this embodiment, the F-number at a focal length of 26.7 mm is 1.9. In addition, the focal length $f_1$ of the optical system to the surface on which the anti-reflection film is formed is 188.7 mm. The axial conversion beam height h on the surface on which the anti-reflection film is formed is 2.4. Thus, the value of D is calculated by Expression (2) as follows.

$$D = 26.7/1.9 = 14.05 \text{ (mm)}$$

In addition, the value of $\theta_1$ is calculated by Expression (1) as follows.

$$\theta_1 = \sin^{-1}(14.05/(2 \times 188.7)) = 2.1°$$

The value of $\theta_2$ is calculated by Expression (3) as follows.

$$\theta_2 = \sin^{-1}((2.4 \times 14.05)/(-73.7)) = -27.2°$$

Therefore, $|\theta_2 - \theta_1|$ is 29.3°, which satisfies the condition of Expression (4). When the condition of Expression (4) is satisfied, the incident angle of the beam passing through the periphery of the lens among the ghost beams with respect to the surface is increased. Because the beam passing through the lens center among the ghost beams has a small incident angle, an effect of the anti-reflection film having a wide reflectance suppression wavelength band is enhanced.

When Expression (4) and Expression (5) are satisfied simultaneously, the incident angle of the ghost beam to the reflecting surface is increased for each of the two surfaces so that the effect of the anti-reflection film is further enhanced.

Figure 4A:
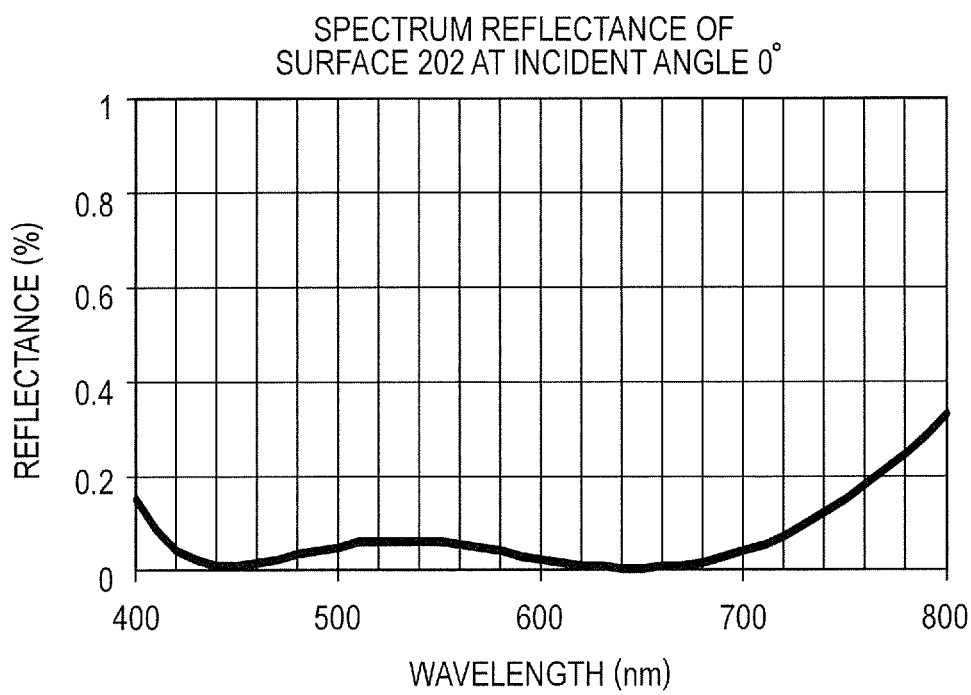
FIG. 4A shows a spectrum reflectance of another surface at an incident angle of 0° according to Embodiment 1.
Figure 4B:
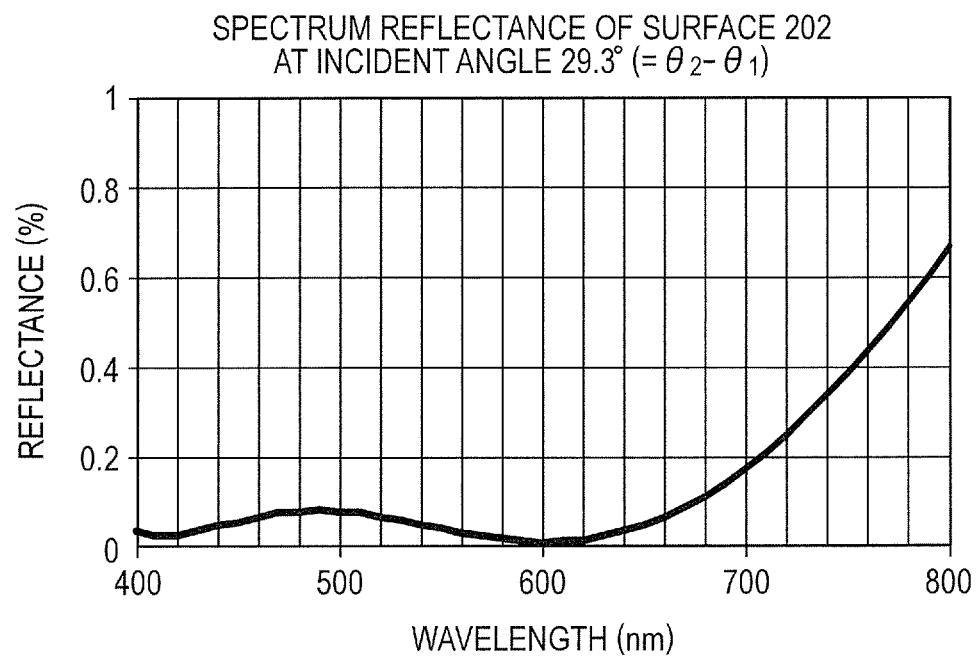
FIG. 4B shows a spectrum reflectance of the another surface at an incident angle of 29.3° according to Embodiment 1.

FIG. 3A shows a spectrum reflectance of the surface 201 at an incident angle of 0°, and FIG. 3B shows a spectrum reflectance of the surface 201 at an incident angle of 29.3° (=$\theta_2 - \theta_1$). FIG. 4A shows a spectrum reflectance of the surface 202 at an incident angle of 0°, and FIG. 4B shows a spectrum reflectance of the surface 202 at an incident angle of 29.3°. The reflectance for a wavelength of 400 to 750 nm is 0.5% or lower at an incident angle of 0° for each of the surface 201 and the surface 202, which have optical characteristics suitable for suppressing reflection.

A ratio ($R_A/R_B$) of a reflectance $R_A$ for light having a wavelength of 400 nm to a reflectance $R_B$ for light having a wavelength of 700 nm at an incident angle of 29.3° (=$\theta_2 - \theta_1$) of the anti-reflection film on the surface 201 is 0.64, while the ratio ($R_A/R_B$) of the anti-reflection film on the surface 202 is 0.20. Each of the surfaces satisfies the condition of Expression (6).

Embodiment 2

Now, with reference to FIGS. 5, 6A, 6B, 7A, and 7B, an image pickup apparatus according to Embodiment 2 of the present invention is described.

Figure 5:
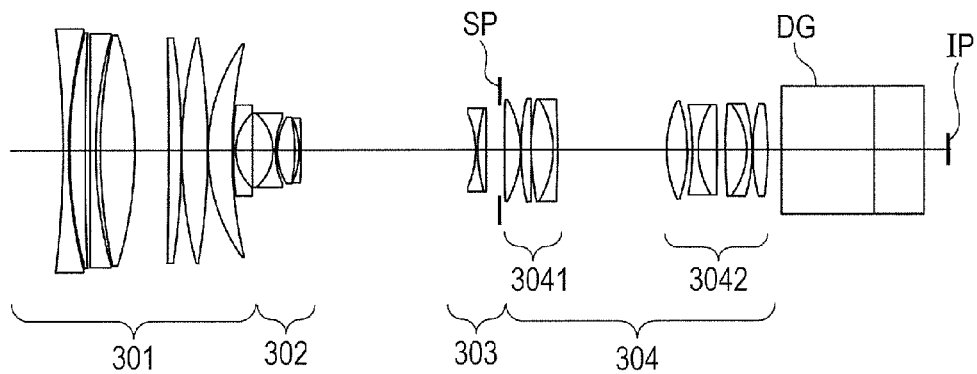
FIG. 5 is a lens cross-sectional view according to Embodiment 2 of the present invention.

FIG. 5 is a structural diagram of a zoom lens according to Embodiment 2 (Numerical Embodiment 2) of the present invention, and is an optical path diagram when being focused on an object at infinity at the wide angle end. In the lens optical path diagram, a first lens unit 301 does not move for zooming and has positive refractive power. The first lens unit 301 has refractive power for focusing, and a whole or a part of the lens unit having refractive power is moved so as to perform focusing. A second lens unit 302 is a lens unit having negative refractive power (variator lens unit), which moves during zooming. A third lens unit 303 is a lens unit having negative refractive power (compensator lens unit), which moves during zooming. This third lens unit 303 moves on the optical axis in synchronization with movement of the second lens unit so as to correct image plane variation due to magnification varying. The aperture stop SP is disposed between the third lens unit 303 and a fourth lens unit 304. The fourth lens unit 304 is a lens unit having positive refractive power for imaging (relay lens unit), which does not move for zooming. The fourth lens unit 304 includes a lens unit 3041 having positive refractive power and a lens unit 3042 having positive refractive power with a longest air gap therebetween. The color separation prism or optical filter DG is illustrated as a glass block. The image plane IP corresponds to the imaging plane of the solid-state image pickup element (photoelectric transducer).

Figure 6A:
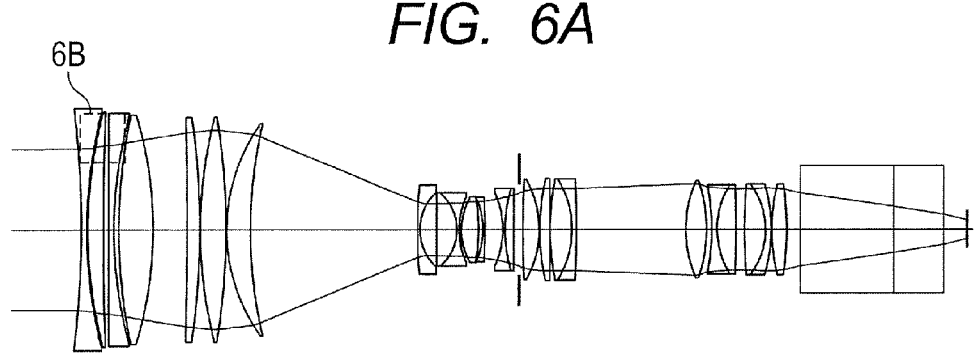
FIG. 6A illustrates an embodiment of a ghost optical path diagram according to Embodiment 2.
Figure 6B:
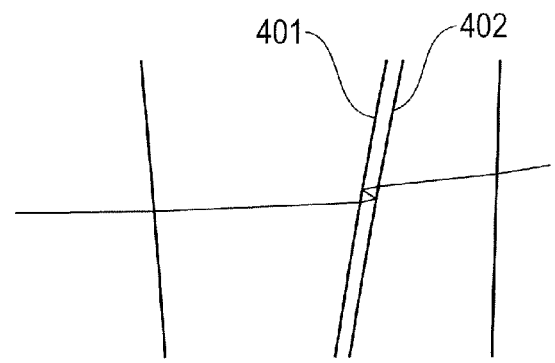
FIG. 6B is a partial enlarged view of the ghost optical path diagram of FIG. 6A.

FIG. 6A illustrates an example of a ghost optical path of the zoom lens at a focal length of 164 mm according to Embodiment 2 (Numerical Embodiment 2) of the present invention. FIG. 6B is a partial enlarged view of the ghost optical path illustrated in FIG. 6A. FIGS. 6A and 6B illustrate the optical path of the ghost beam in the case where the focus position is set to an object distance of infinity and a light source is set at 3 m (from the lens surface closest to the object). Here, the ghost light from the light source is reflected in order by a surface 402 and a surface 401, which are adjacent to each other with the air layer therebetween, and reaches the image plane IP. The anti-reflection film having multiple subwavelength structures at an average pitch of 400 nm or smaller and a wide reflectance suppression wavelength band is formed on the surface 401. This subwavelength structure includes multiple micro convex/concave structures having a density decreasing continuously from the glass side to the air side. With this structure, a substantial refractive index gradually approaches 1 from the glass side to the air side. Thus, the anti-reflection film having a wide reflectance suppression wavelength band is realized. As in this embodiment of the present invention, by forming the anti-reflection film on at least one of the surfaces reflecting the ghost light, a sufficient effect can be produced.

In this embodiment, the curvature radius $R_1$ of the surface 401 (concave lens surface) is 156.0 mm, and the curvature radius $R_2$ of the surface 402 (convex lens surface) is 148.8 mm. Each of the surfaces is formed to be concave toward the aperture stop. $R_1/R_2$ is 1.04. Therefore, the condition of Expression (5) is satisfied. When the upper- and lower-limit conditions are satisfied, the incident angles of the ghost beam to the two surfaces reflecting the ghost light have similar values. The surface 402 has d-line (587.56 nm) refractive indexes of nb=1.800, ni=1.63, and ns=1.4-1.0. The expression "1.4-1.0" means that the refractive index is continuously decreased from 1.4 to 1.0 from the intermediate film side to the front surface side. Also in this embodiment, the condition of Expression (7) is satisfied and unnecessary reflection light having a large beam incident angle is effectively suppressed.

In this embodiment, the F-number at a focal length of 164 mm is 2.7. In addition, the focal length $f_1$ to the surface on which the anti-reflection film is formed is −130.0 mm. The axial conversion beam height h on the surface on which the anti-reflection film is formed is 1.0. Thus, the value of D is calculated by Expression (2) as follows.

$D=164/2.7=61.9$ (mm)

In addition, the value of $\theta_1$ is calculated by Expression (1) as follows.

$\theta_1=\sin^{-1}(61.9/(2\times-130.0))=-13.8°$

The value of $\theta_2$ is calculated by Expression (3) as follows.

$\theta_2=\sin^{-1}((1.0\times61.9)/148.8)=24.6°$

Therefore, $|\theta_2-\theta_1|$ is 38.4°, which satisfies the condition of Expression (4). When the condition of Expression (4) is satisfied, the incident angle of the beam passing through the periphery of the lens among the ghost beams with respect to the surface is increased. Because the beam passing through the lens center among the ghost beams has a small incident angle, an effect of the anti-reflection film having a wide reflectance suppression wavelength band is enhanced.

When Expression (4) and Expression (5) are satisfied simultaneously, the incident angle of the ghost beam to the reflecting surface is increased for each of the two surfaces so that the effect of the anti-reflection film is further enhanced.

Figure 7A:
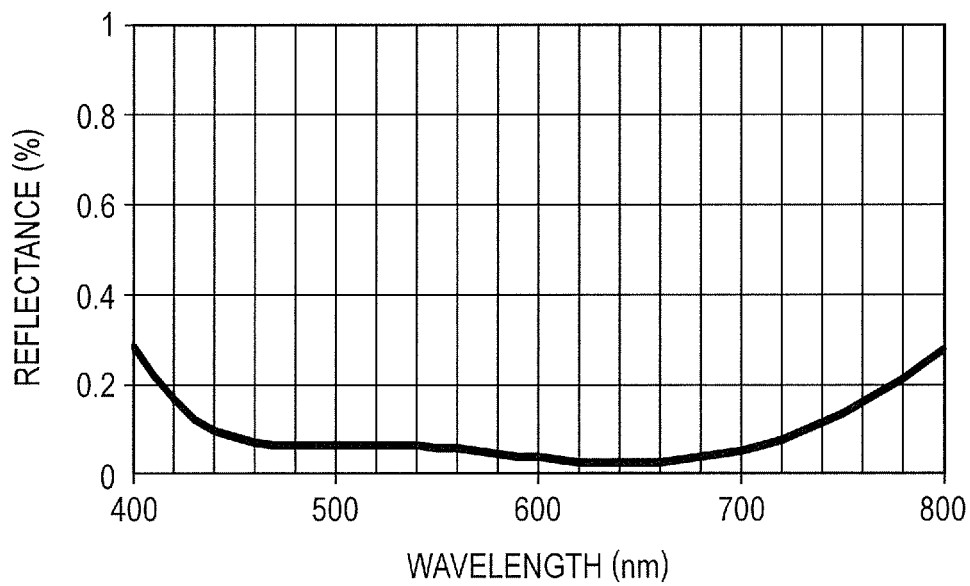
FIG. 7A shows a spectrum reflectance of a surface at an incident angle of 0° according to Embodiment 2.
Figure 7B:
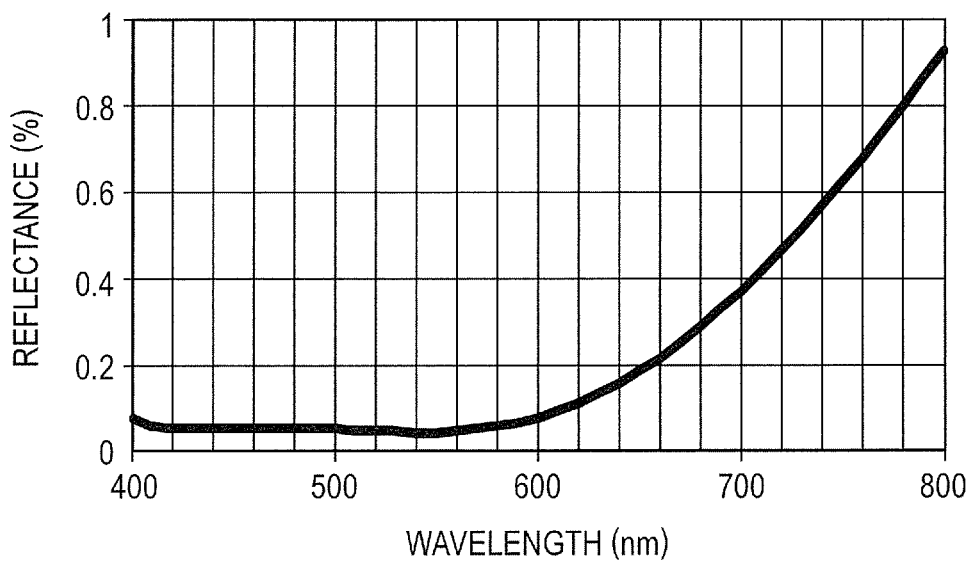
FIG. 7B shows a spectrum reflectance of the surface 401 at an incident angle of 38.4° according to Embodiment 2.

FIG. 7A shows a spectrum reflectance of the surface 401 at an incident angle of 0°, and FIG. 7B shows a spectrum reflectance of the surface 401 at an incident angle of 38.4° ($=\theta_2-\theta_1$). The reflectance for a wavelength of 400 to 750 nm is 0.5% or lower at an incident angle of 0° to the surface 401, which has optical characteristics suitable for suppressing reflection.

The ratio ($R_A/R_B$) of the reflectance $R_A$ for light having a wavelength of 400 nm to the reflectance $R_B$ for light having a wavelength of 700 nm at an incident angle of 38.4° ($=\theta_2-\theta_1$) of the anti-reflection film on the surface 401 is 0.20. The surface satisfies the condition of Expression (6).

Embodiment 3

Now, with reference to FIGS. 8, 9A, 9B, 10A, 10B, 11A, and 11B, an image pickup apparatus according to Embodiment 3 of the present invention is described.

Figure 8:
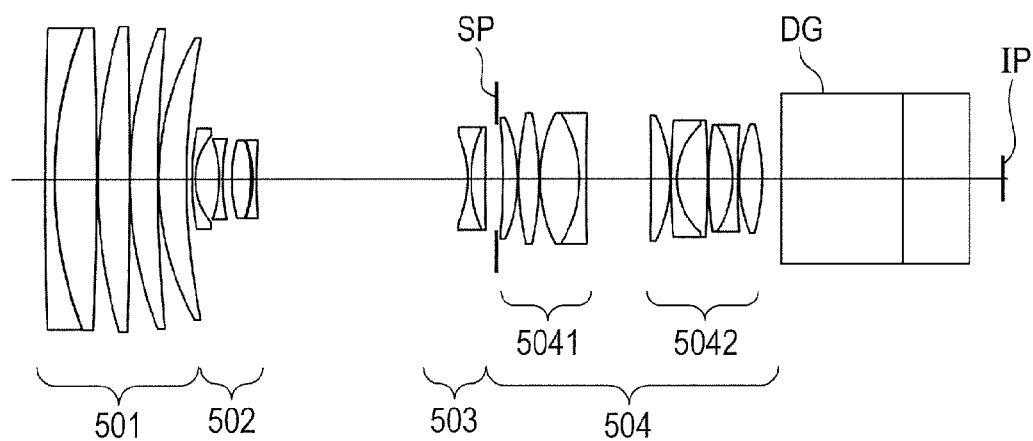
FIG. 8 is a lens cross-sectional view according to Embodiment 3 of the present invention.

FIG. 8 is a structural diagram of a zoom lens according to Embodiment 3 (Numerical Embodiment 3) of the present invention, and is an optical path diagram when being focused on an object at infinity at the wide angle end. In the lens optical path diagram, a first lens unit 501 does not move for zooming and has positive refractive power. The first lens unit 501 has refractive power for focusing, and a whole or a part of the lens unit having refractive power is moved so as to perform focusing. A second lens unit 502 is a lens unit having negative refractive power (variator lens unit), which moves during zooming. A third lens unit 503 is a lens unit having negative refractive power (compensator lens unit), which moves during zooming. This third lens unit 503 moves on the optical axis in synchronization with movement of the second lens unit so as to correct image plane variation due to magnification varying. The aperture stop SP is disposed between the third lens unit 503 and a fourth lens unit 504. The fourth lens unit 504 is a lens unit having positive refractive power for imaging (relay lens unit), which does not move for zooming. The fourth lens unit 504 includes a lens unit 5041 having positive refractive power and a lens unit 5042 having positive refractive power with a longest air gap therebetween. The color separation prism or optical filter DG is illustrated as a glass block. The image plane IP corresponds to the imaging plane of the solid-state image pickup element (photoelectric transducer).

Figure 9A:
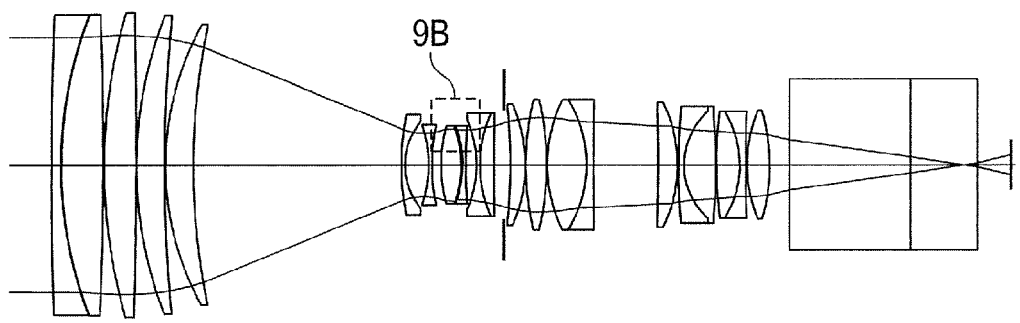
FIG. 9A illustrates an embodiment of a ghost optical path diagram according to Embodiment 3.
Figure 9B:
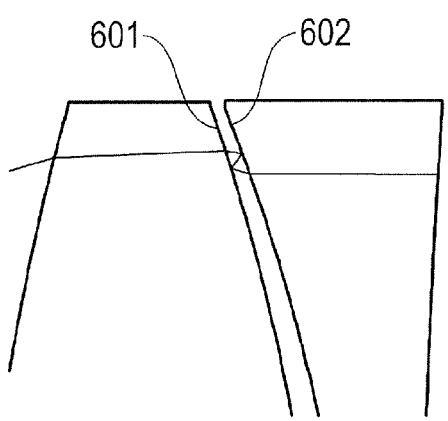
FIG. 9B is a partial enlarged view of the ghost optical path diagram of FIG. 9A.

FIG. 9A illustrates an example of a ghost optical path of the zoom lens at a focal length of 150 mm according to Embodiment 3 (Numerical Embodiment 3) of the present invention. FIG. 9B is a partial enlarged view of the ghost optical path illustrated in FIG. 9A. FIGS. 9A and 9B illustrate the optical path of the ghost beam in the case where the focus position is set to an object distance of infinity and a light source is set at 3 m (from the lens surface closest to the object). Here, the ghost light from the light source is reflected in order by a surface 602 and a surface 601, which are adjacent to each other with the air layer therebetween, and reaches the image plane IP. The anti-reflection film having multiple subwavelength structures at an average pitch of 400 nm or smaller and a wide reflectance suppression wavelength band is formed on the surface 601 and the surface 602. This subwavelength structure has multiple fine air holes so as to reduce the density, and hence the substantial refractive index is reduced to 1.30 or smaller. This subwavelength structure is formed on an outermost layer (layer brought into contact with the air), and a lower layer is formed of a multilayer film. Thus, the anti-reflection film having a wide reflectance suppression wavelength band is realized.

In this embodiment, the curvature radius $R_1$ of the surface 601 (convex lens surface) is −28.9 mm, and the curvature radius $R_2$ of the surface 602 (concave lens surface) is −25.06 mm. Each of the surfaces is formed to be convex toward the aperture stop. $R_1/R_2$ is 1.15. Therefore, the condition of Expression (5) is satisfied. When this condition of Expression (5) is satisfied, the incident angles of the ghost beam to the two surfaces reflecting the ghost light have similar values.

In this embodiment, the F-number at a focal length of 150 mm is 2.1. In addition, the focal length $f_1$ of the optical system to the surface on which the anti-reflection film is formed is −422.9 mm. The axial conversion beam height h on the surface on which the anti-reflection film is formed is 0.25. Thus, the value of D is calculated by Expression (2) as follows.

$D=150/2.1=71.4$ (mm)

In addition, the value of $\theta_1$ is calculated by Expression (1) as follows.

$\theta_1=\sin^{-1}(71.4/(2\times-422.9))=-4.8°$

The value of $\theta_2$ is calculated by Expression (3) as follows.

$\theta_2=\sin^{-1}((0.25\times71.4)/(-25.06))=-45.4°$

Therefore, $|\theta_2-\theta_1|$ is 40.6°, which satisfies the condition of Expression (4). When the condition of Expression (4) is satisfied, the incident angle of the beam passing through the periphery of the lens among the ghost beams with respect to the surface is increased. Because the beam passing through the lens center among the ghost beams has a small incident angle, an effect of the anti-reflection film having a wide reflectance suppression wavelength band is enhanced.

When Expression (4) and Expression (5) are satisfied simultaneously, the incident angle of the ghost beam to the reflecting surface is increased for each of the two surfaces so that the effect of the anti-reflection film is further enhanced.

Figure 10A:
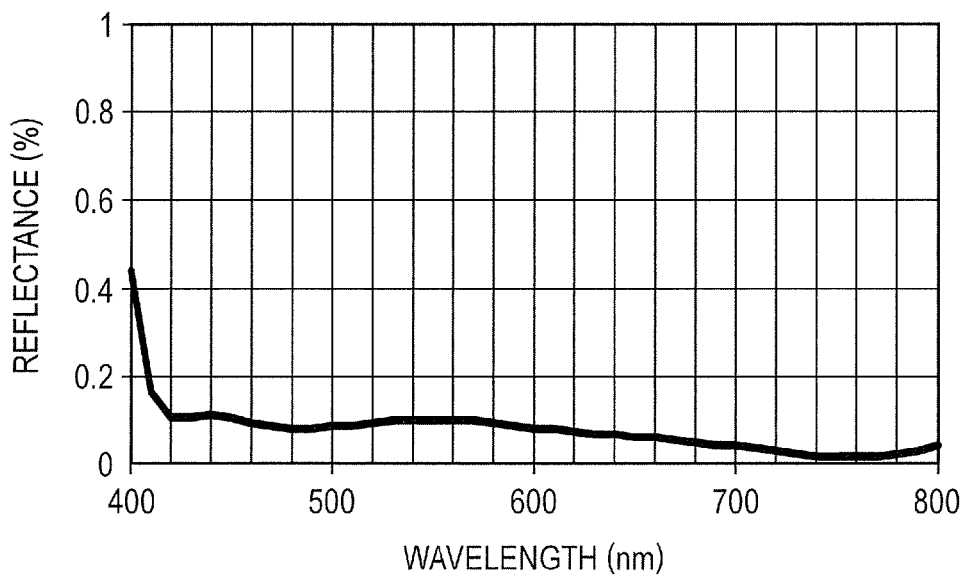
FIG. 10A shows a spectrum reflectance of a surface at an incident angle of 0° according to Embodiment 3.
Figure 10B:
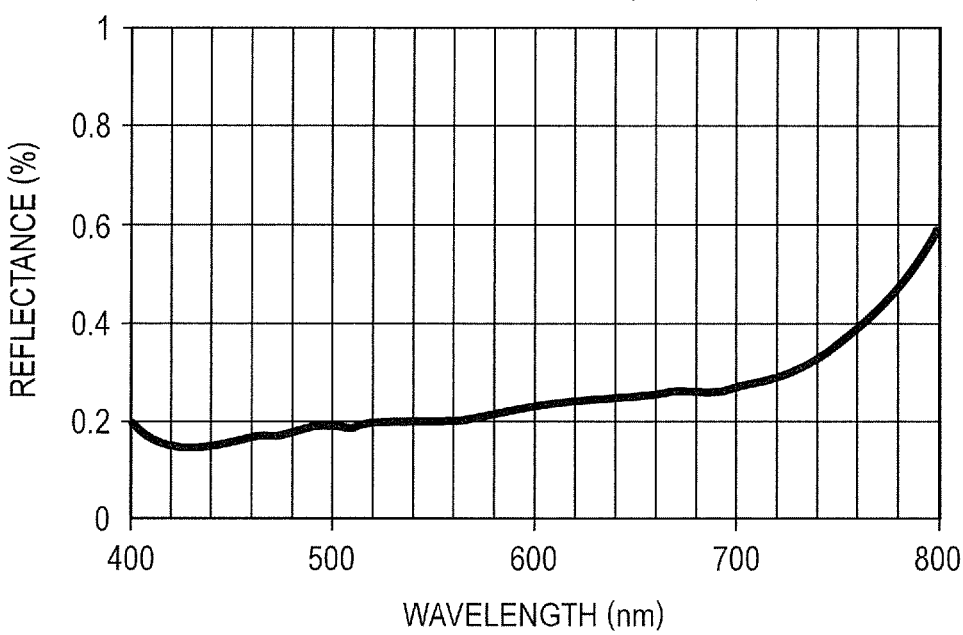
FIG. 10B shows a spectrum reflectance of the surface at an incident angle of 40.6° according to Embodiment 3.
Figure 11A:
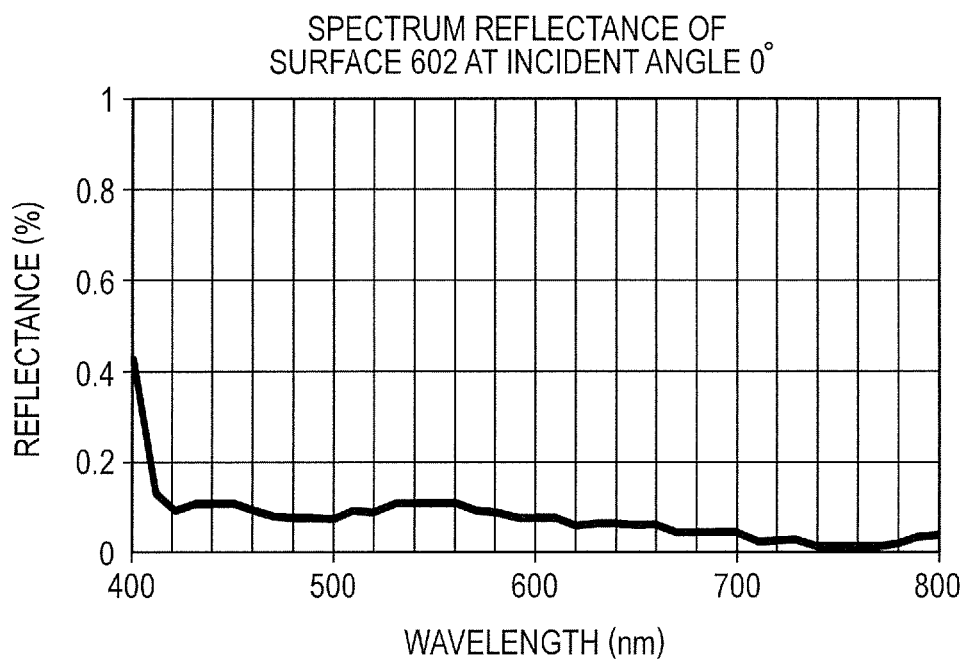
FIG. 11A shows a spectrum reflectance of another surface at an incident angle of 0° according to Embodiment 3.
Figure 11B:
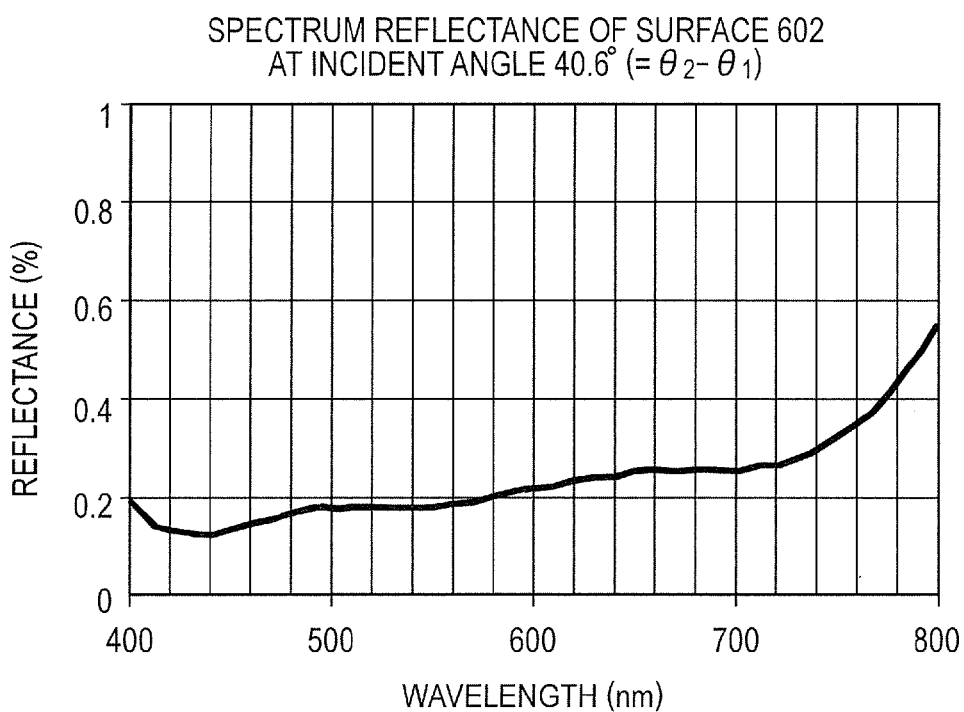
FIG. 11B shows a spectrum reflectance of the another surface at an incident angle of 40.6° according to Embodiment 3.

FIG. 10A shows a spectrum reflectance of the surface 601 at an incident angle of 0°, and FIG. 10B shows a spectrum reflectance of the surface 601 at an incident angle of 40.6° $(=\theta_2-\theta_1)$. FIG. 11A shows a spectrum reflectance of the surface 602 at an incident angle of 0°, and FIG. 11B shows a spectrum reflectance of the surface 602 at an incident angle of 40.6°. The reflectance for a wavelength of 400 to 750 nm is 0.5% or lower at an incident angle of 0° for each of the surface 601 and the surface 602, which have optical characteristics suitable for suppressing reflection.

The ratio $(R_A/R_B)$ of the reflectance $R_A$ for light having a wavelength of 400 nm to the reflectance $R_B$ for light having a wavelength of 700 nm at an incident angle of 40.6° $(=\theta_2-\theta_1)$ of the anti-reflection film on the surface 601 is 0.69, while the ratio $(R_A/R_B)$ of the anti-reflection film on the surface 602 is 0.72. Each of the surfaces satisfies the condition of Expression (6).

Now, Numerical Embodiments 1 to 3 which respectively correspond to Embodiments 1 to 3 of the present invention are described. In each numerical embodiment, a surface number is counted from the object side, "r" represents a curvature radius of each surface, "d" represents an interval between surfaces, and "nd" and "vd" represent a refractive index and an Abbe constant of each surface, respectively. The last three surfaces correspond to a glass block such as a filter.

Assume that the optical axis direction is an X-axis, a direction perpendicular to the optical axis is an H axis, and a light traveling direction is positive. In this case, an aspherical surface shape is expressed by the following expression:

$$X = \frac{H^2/R}{1+\sqrt{1-(1+k)(H/R)^2}} + A4 \times H^4 +$$
$$A6 \times H^6 + A8 \times H^8 + A10 \times H^{10} + A12 \times H^{12} +$$
$$A3 \times H^3 + A5 \times H^5 + A7 \times H^7 + A9 \times H^9 + A11 \times H^{11}$$

where "R" represents a paraxial curvature radius, "k" represents a conic constant, and "A3", "A4", "A5", "A6", "A7", "A8", "A9", "A10", "A11", and "A12" represent aspherical coefficients.

For example, "e-Z" means "×10$^{-z}$". The mark "*" represents the aspherical surface.

Numerical Embodiment 1

| | Unit: mm | | | |
|---|---|---|---|---|
| | Surface data | | | |
| Surface number | r | d | nd | vd |
| 1 | ∞ | 0.00 | | |
| 2* | 227.195 | 2.50 | 1.77250 | 49.6 |
| 3 | 33.736 | 19.76 | | |
| 4 | 311.589 | 1.85 | 1.75500 | 52.3 |
| 5 | 80.391 | 13.54 | | |
| 6 | −80.728 | 1.75 | 1.75500 | 52.3 |
| 7 | −17642.010 | 1.30 | | |
| 8 | 135.169 | 6.62 | 1.80518 | 25.4 |
| 9 | −339.711 | 1.16 | | |
| 10 | 328.904 | 9.40 | 1.51633 | 64.1 |
| 11* | −74.094 | 11.86 | | |
| 12 | 1211.778 | 8.57 | 1.49700 | 81.5 |
| 13 | −79.634 | 0.60 | | |
| 14 | −73.669 | 1.65 | 1.88300 | 40.8 |
| 15 | −126.215 | 0.20 | | |
| 16 | 182.391 | 1.65 | 2.00330 | 28.3 |
| 17 | 55.727 | 10.56 | 1.49700 | 81.5 |
| 18 | −405.898 | 0.20 | | |
| 19 | 130.732 | 9.01 | 1.49700 | 81.5 |
| 20 | −91.216 | 0.20 | | |
| 21 | 57.687 | 7.79 | 1.62041 | 60.3 |

-continued

| Unit: mm | | | | |
|---|---|---|---|---|
| 22 | 1234.500 | (Variable) | | |
| 23 | 52.721 | 0.75 | 1.88300 | 40.8 |
| 24 | 13.435 | 3.29 | | |
| 25 | 67.192 | 0.75 | 1.88300 | 40.8 |
| 26 | 36.490 | 2.83 | | |
| 27 | −48.656 | 4.75 | 1.80518 | 25.4 |
| 28 | −12.990 | 0.80 | 1.88300 | 40.8 |
| 29 | −1003.160 | 0.20 | | |
| 30 | 33.652 | 2.54 | 1.68893 | 31.1 |
| 31 | 1299.417 | (Variable) | | |
| 32 | −26.243 | 0.75 | 1.75500 | 52.3 |
| 33 | 52.073 | 2.45 | 1.80809 | 22.8 |
| 34 | −173.421 | (Variable) | | |
| 35 (Stop) | ∞ | 1.40 | | |
| 36 | −2714.731 | 3.10 | 1.54814 | 45.8 |
| 37 | −50.891 | 0.20 | | |
| 38 | 602.181 | 2.63 | 1.72047 | 34.7 |
| 39 | −91.266 | 0.20 | | |
| 40 | 89.412 | 7.01 | 1.72047 | 34.7 |
| 41 | −29.829 | 1.20 | 1.92286 | 18.9 |
| 42 | −376.636 | 34.00 | | |
| 43 | 109.441 | 4.19 | 1.92286 | 18.9 |
| 44 | −71.553 | 6.52 | | |
| 45 | −271.962 | 1.20 | 1.88300 | 40.8 |
| 46 | 21.754 | 5.08 | 1.49700 | 81.5 |
| 47 | 5940.652 | 0.24 | | |
| 48 | 35.588 | 7.15 | 1.49700 | 81.5 |
| 49 | −19.719 | 1.20 | 2.00330 | 28.3 |
| 50 | −139.767 | 0.15 | | |
| 51 | 93.336 | 5.53 | 1.49700 | 81.5 |
| 52 | −26.428 | 4.00 | | |
| 53 | ∞ | 33.00 | 1.60859 | 46.4 |
| 54 | ∞ | 13.20 | 1.51680 | 64.2 |
| 55 | ∞ | (Variable) | | |
| Image plane | ∞ | | | |

Aspherical surface data

Second surface

K = −5.42173e+001    A4 = 1.90661e−006    A6 = 3.73103e−011    A8 = −1.91524e−013
A10 = −6.77526e−019
A3 = −4.12872e−006    A5 = −1.32181e−008    A7 = 2.42261e−012    A9 = 2.44378e−015

Eleventh surface

K = −2.28238e+000    A4 = −2.08837e−007    A6 = 2.96604e−011    A8 = 3.48782e−013
A10 = −1.18721e−016
A3 = −6.36724e−007    A5 = 5.61037e−010    A7 = −1.11164e−011    A9 = −3.18271e−016

Various data
Zoom ratio 13.00

| Focal length | 4.45 | 16.02 | 26.70 | 57.85 |
|---|---|---|---|---|
| F-number | 1.90 | 1.91 | 1.91 | 2.80 |
| Angle of field | 51.02 | 18.95 | 11.64 | 5.43 |
| Image height | 5.50 | 5.50 | 5.50 | 5.50 |
| Total lens length | 300.27 | 300.27 | 300.27 | 300.27 |
| BF | 38.16 | 38.16 | 38.16 | 38.16 |
| d22 | 0.56 | 30.70 | 37.70 | 44.28 |
| d31 | 42.27 | 8.70 | 3.49 | 6.35 |
| d34 | 9.00 | 12.43 | 10.63 | 1.19 |
| d55 | 4.99 | 4.99 | 4.99 | 4.99 |

Zoom lens unit data

| Unit | First surface | Focal length |
|---|---|---|
| 1 | 1 | 26.70 |
| 2 | 23 | −16.80 |
| 3 | 32 | −43.80 |
| 4 | 35 | 52.80 |

Numerical Embodiment 2

| | Unit: mm | | | |
|---|---|---|---|---|
| | Surface data | | | |
| Surface number | r | d | nd | vd |
| 1 | −321.282 | 1.80 | 1.80000 | 29.8 |
| 2 | 155.978 | 0.27 | | |
| 3 | 148.778 | 5.00 | 1.43387 | 95.1 |
| 4 | 939.166 | 1.64 | | |
| 5 | 7215.908 | 1.80 | 1.80000 | 29.8 |
| 6 | 142.263 | 1.56 | | |
| 7 | 181.560 | 11.04 | 1.43387 | 95.1 |
| 8 | −127.642 | 10.88 | | |
| 9 | −2147.703 | 4.17 | 1.43387 | 95.1 |
| 10 | −253.410 | 0.15 | | |
| 11 | 146.659 | 8.29 | 1.59240 | 68.3 |
| 12 | −222.853 | 0.15 | | |
| 13 | 59.292 | 7.70 | 1.77250 | 49.6 |
| 14 | 152.159 | (Variable) | | |
| 15* | 228.519 | 0.70 | 1.88300 | 40.8 |
| 16 | 16.263 | 5.43 | | |
| 17 | — | 6.59 | 1.80518 | 25.4 |
| 18 | −15.549 | 0.70 | 1.75500 | 52.3 |
| 19 | 25.590 | 0.68 | | |
| 20 | 20.925 | 5.61 | 1.60342 | 38.0 |
| 21 | −53.448 | 1.38 | | |
| 22 | −24.853 | 0.70 | 1.83481 | 42.7 |
| 23 | −134.693 | (Variable) | | |
| 24 | −28.312 | 0.70 | 1.74320 | 49.3 |
| 25 | 46.740 | 2.80 | 1.84666 | 23.8 |
| 26 | −2634.956 | (Variable) | | |
| 27 (Stop) | ∞ | 1.30 | | |
| 28 | 394.928 | 5.18 | 1.65844 | 50.9 |
| 29 | −33.348 | 0.15 | | |
| 30 | 74.155 | 3.20 | 1.51823 | 58.9 |
| 31 | 3654.252 | 0.15 | | |
| 32 | 83.980 | 7.00 | 1.51633 | 64.1 |
| 33 | −31.528 | 1.50 | 1.83400 | 37.2 |
| 34 | −336.280 | 35.20 | | |
| 35 | 38.818 | 6.68 | 1.48749 | 70.2 |
| 36 | −49.746 | 1.67 | | |
| 37 | −75.132 | 1.80 | 1.83481 | 42.7 |
| 38 | 27.229 | 6.15 | 1.51742 | 52.4 |
| 39 | −399.526 | 2.67 | | |
| 40 | 180.001 | 6.83 | 1.48749 | 70.2 |
| 41 | −24.173 | 1.80 | 1.83400 | 37.2 |
| 42 | −51.301 | 0.18 | | |
| 43 | 58.679 | 4.80 | 1.51633 | 64.1 |
| 44 | −104.601 | 4.50 | | |
| 45 | ∞ | 30.00 | 1.60342 | 38.0 |
| 46 | ∞ | 16.20 | 1.51633 | 64.2 |
| 47 | ∞ | (Variable) | | |
| Image plane | ∞ | | | |

Aspherical surface data
Fifteenth surface

K = 8.58860e+000  A4 = 7.05382e−006  A6 = −1.80303e−008  A8 = 7.49637e−011
A10 = −8.01854e−013  A12 = 5.80206e−015
A3 = −4.50041e−007  A5 = 1.66019e−008  A7 = −8.87373e−010  A9 = 1.99340e−011
A11 = −1.17115e−013

Various data
Zoom ratio 20.00

| Focal length | 8.20 | 16.40 | 33.29 | 109.33 | 164.00 |
|---|---|---|---|---|---|
| F-number | 1.80 | 1.80 | 1.80 | 1.87 | 2.73 |
| Angle of field | 33.85 | 18.54 | 9.38 | 2.88 | 1.92 |
| Image height | 5.50 | 5.50 | 5.50 | 5.50 | 5.50 |
| Total lens length | 268.50 | 268.50 | 268.50 | 268.50 | 268.50 |
| BF | 41.33 | 41.33 | 41.33 | 41.33 | 41.33 |
| d14 | 0.53 | 22.20 | 36.98 | 51.19 | 53.78 |
| d23 | 56.24 | 31.47 | 14.23 | 3.29 | 5.68 |
| d26 | 4.40 | 7.50 | 9.97 | 6.69 | 1.71 |
| d47 | 7.50 | 7.50 | 7.50 | 7.50 | 7.50 |

-continued

| Unit: mm | | |
|---|---|---|
| Zoom lens unit data | | |
| Unit | First surface | Focal length |
| 1 | 1 | 67.24 |
| 2 | 15 | −13.70 |
| 3 | 24 | −42.20 |
| 4 | 27 | 65.91 |

Numerical Embodiment 3

| Unit: mm | | | |
|---|---|---|---|
| Surface data | | | |
| Surface number | r | d | nd | vd |
|---|---|---|---|---|
| 1 | 959.780 | 2.30 | 1.81265 | 25.4 |
| 2 | 101.240 | 0.10 | | |
| 3 | 101.060 | 10.15 | 1.48915 | 70.2 |
| 4 | −873.870 | 0.20 | | |
| 5 | 133.990 | 7.77 | 1.51825 | 64.2 |
| 6 | −1406.740 | 0.00 | | |
| 7 | 99.830 | 6.79 | 1.60548 | 60.7 |
| 8 | 368.440 | 0.20 | | |
| 9 | 70.690 | 6.76 | 1.69979 | 55.5 |
| 10 | 166.410 | (Variable) | | |
| 11 | 60.980 | 0.80 | 1.83945 | 42.7 |
| 12 | 16.220 | 5.81 | | |
| 13 | −29.730 | 0.80 | 1.80811 | 46.6 |
| 14 | 47.690 | 2.24 | | |
| 15 | 35.800 | 4.73 | 1.81265 | 25.4 |
| 16 | −28.900 | 0.43 | | |
| 17 | −25.060 | 0.80 | 1.77621 | 49.6 |
| 18 | 142.670 | (Variable) | | |
| 19* | −26.074 | 0.80 | 1.79013 | 44.2 |
| 20 | 30.870 | 3.47 | 1.85501 | 23.9 |
| 21 | 736.140 | (Variable) | | |
| 22 (Stop) | ∞ | 1.40 | | |
| 23 | −140.140 | 3.57 | 1.72794 | 38.0 |
| 24 | −37.070 | 0.20 | | |
| 25 | 68.870 | 4.98 | 1.51314 | 60.5 |
| 26 | −69.050 | 0.20 | | |
| 27 | 35.780 | 9.49 | 1.50229 | 66.0 |
| 28 | −30.390 | 1.66 | 1.83932 | 37.2 |
| 29 | 542.750 | 15.69 | | |
| 30 | −770.530 | 4.69 | 1.51314 | 60.5 |
| 31 | −34.660 | 0.20 | | |
| 32 | 156.950 | 1.40 | 1.83932 | 37.2 |
| 33 | 17.570 | 7.55 | 1.50014 | 65.0 |
| 34 | −183.300 | 0.20 | | |
| 35 | 91.810 | 5.69 | 1.51977 | 52.4 |
| 36 | −24.460 | 1.40 | 1.80811 | 46.6 |
| 37 | 268.360 | 0.30 | | |
| 38 | 33.660 | 5.54 | 1.51977 | 52.4 |
| 39 | −46.300 | 4.73 | | |
| 40 | ∞ | 29.35 | 1.60718 | 38.0 |
| 41 | ∞ | 16.20 | 1.51825 | 64.2 |
| 42 | ∞ | (Variable) | | |
| Image plane | ∞ | | | |

| Aspherical surface data | | |
|---|---|---|
| Nineteenth surface | | |
| K = 0.00000e+000 | A6 = 2.36359e−008 | A8 = −2.17787e−010 | A10 = 6.77619e−013 |

| Various data | | | | |
|---|---|---|---|---|
| Zoom ratio 15.02 | | | | |
| Focal length | 10.00 | 19.67 | 39.99 | 100.04 | 150.09 |
| F-number | 1.80 | 1.80 | 1.80 | 1.80 | 2.10 |
| Angle of field | 28.82 | 15.62 | 7.83 | 3.15 | 2.10 |
| Image height | 5.50 | 5.50 | 5.50 | 5.50 | 5.50 |

-continued

| Unit: mm | | | | | |
|---|---|---|---|---|---|
| Total lens length | 215.48 | 215.48 | 215.48 | 215.49 | 215.47 |
| BF | 41.84 | 41.84 | 41.84 | 41.86 | 41.83 |
| d10 | 1.29 | 21.22 | 35.40 | 46.98 | 50.25 |
| d18 | 51.14 | 28.95 | 12.97 | 2.71 | 2.61 |
| d21 | 2.90 | 5.16 | 6.96 | 5.63 | 2.47 |
| d42 | 8.18 | 8.18 | 8.18 | 8.20 | 8.17 |

| Zoom lens unit data | | |
|---|---|---|
| Unit | First surface | Focal length |
| 1 | 1 | 77.99 |
| 2 | 11 | −13.79 |
| 3 | 19 | −34.00 |
| 4 | 22 | 38.07 |

A relationship between each parameter and each embodiment of the present invention is shown in Table 1 below.

TABLE 1

| | f | $f_1$ | FNo | h | D | $\theta_1$ | $\theta_2$ | $R_1/R_2$ | $|\theta_2 - \theta_1|$ | $R_A/R_B$ |
|---|---|---|---|---|---|---|---|---|---|---|
| Embodiment 1 | 26.7 | 188.7 | 1.9 | 2.4 | 14.05 | 2.1 | −27.2 | 1.08 | 29.3 | 0.64, 0.20 |
| Embodiment 2 | 164 | −130.0 | 2.7 | 1.0 | 61.9 | −13.8 | 24.6 | 1.04 | 38.4 | 0.20 |
| Embodiment 3 | 150 | −422.9 | 2.1 | 0.25 | 71.4 | −4.8 | −45.4 | 1.15 | 40.6 | 0.69, 0.72 |

The exemplary embodiments of the present invention are described above, but the present invention is not limited to these embodiments and can be modified and changed variously within the gist of the present invention. In addition, when an image pickup apparatus including the lens apparatus exemplified in the embodiments of the present invention and an image pickup element for receiving light that is to be imaged by the lens apparatus is formed, it is possible to provide the image pickup apparatus that suppresses unnecessary reflection light having a large beam incident angle and reduces occurrence of ghost or flare.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-180515, filed on Aug. 16, 2012, which is hereby incorporated by reference herein in its entirety.

What is claimed is:

1. A lens apparatus, comprising an optical system comprising a concave lens surface and a convex lens surface adjacent to each other with an air layer therebetween,
wherein at least one of the concave lens surface and the convex lens surface comprises an anti-reflection film comprising multiple subwavelength structures at an average pitch of 400 nm or smaller, and
wherein the at least one of the concave lens surface and the convex lens surface satisfies the following expressions:

$0.7 < R_1/R_2 < 1.3$, and $|\theta_2 - \theta_1| > 15°$, provided that:

$D = f/FNo$, $\theta_1 = \sin^{-1}(D/(2 \times f_1))$, and $\theta_2 = \sin^{-1}((h \times D)/R_2)$ where f represents a focal length of the entire optical system, $f_1$ represents a focal length of an optical system on an object side with respect to the air layer between the concave lens surface and the convex lens surface, FNo represents an F-number of the entire optical system, h represents an axial conversion beam height on the at least one of the concave lens surface and the convex lens surface having the anti-reflection film formed thereon, $R_1$ represents a curvature radius of a surface situated on the object side between the concave lens surface and the convex lens surface, and $R_2$ represents a curvature radius of a surface situated on an image side between the concave lens surface and the convex lens surface.

2. A lens apparatus according to claim 1, wherein the at least one of the concave lens surface and the convex lens surface comprising the multiple subwavelength structures comprises an intermediate film disposed between the multiple subwavelength structures and the at least one of the concave lens surface and the convex lens surface, the intermediate film comprising one of a single layer film and a multilayer film made of a material different from a material of the multiple subwavelength structures.

3. A lens apparatus according to claim 2, wherein the intermediate film is made of an organic resin.

4. A lens apparatus according to claim 2, wherein the intermediate film satisfies the following expression:

$nb \geq ni \geq ns$, where nb represents a refractive index of a material of a lens forming the at least one of the concave lens surface and the convex lens surface comprising the multiple subwavelength structures, ni represents a refractive index of the material of the intermediate film, and ns represents a refractive index of the material of the multiple subwavelength structures.

5. A lens apparatus according to claim 1,
wherein the anti-reflection film comprises a multilayer film comprising an outermost layer having a refractive index of 1.30 or smaller, and
wherein the anti-reflection film has a reflectance of 0.5% or lower at an incident angle of 0° for a wavelength of 400 to 750 nm.

6. A lens apparatus according to claim 1, wherein the anti-reflection film satisfies the following expression:

$0.1 < R_A/R_B < 1.5$, where $R_A$ represents a reflectance at an incident angle of $\theta_2 - \theta_1$ for light having a wavelength of 400 nm, and $R_B$ represents a reflectance at an incident angle of $\theta_2 - \theta_1$ for light having a wavelength of 700 nm.

7. An image pickup apparatus, comprising:
a lens apparatus, comprising an optical system comprising a concave lens surface and a convex lens surface adjacent to each other with an air layer therebetween,
wherein at least one of the concave lens surface and the convex lens surface comprises an anti-reflection film comprising multiple subwavelength structures at an average pitch of 400 nm or smaller, and
wherein the at least one of the concave lens surface and the convex lens surface satisfies the following expressions:

$0.7 < R_1/R_2 < 1.3$, and $|\theta_2 - \theta_1| > 15°$, provided that:

$D = f/FNo$, $\theta_1 = \sin^{-1}(D/(2 \times f_1))$, and $\theta_2 = \sin^{-1}((h \times D)/R_2)$, where f represents a focal length of the entire optical system, $f_1$ represents a focal length of an optical system on an object side with respect to the air layer between the concave lens surface and the convex lens surface, FNo represents an F-number of the entire optical system, h represents an axial conversion beam height on the at least one of the concave lens surface and the convex lens surface having the anti-reflection film formed thereon, $R_1$ represents a curvature radius of a surface situated on the object side between the concave lens surface and the convex lens surface, and $R_2$ represents a curvature radius of a surface situated on an image side between the concave lens surface and the convex lens surface; and
an image pickup element for receiving light that is to be imaged by the lens apparatus.

* * * * *